United States Patent [19]

Tsipris

[11] Patent Number: 5,603,282

[45] Date of Patent: Feb. 18, 1997

[54] UTILITY PIPE DISPLACEMENT SENSOR

[75] Inventor: Pavel Tsipris, Chicago, Ill.

[73] Assignee: STS Consultants Ltd., Deerfield, Ill.

[21] Appl. No.: 634,790

[22] Filed: Apr. 19, 1996

[51] Int. Cl.$^6$ ................................................. G08B 5/00
[52] U.S. Cl. .......................... 116/209; 116/215; 116/281
[58] Field of Search ................... 33/1 H, 529; 116/209, 116/215, 281, 282, 283

[56] References Cited

U.S. PATENT DOCUMENTS

| | | |
|---|---|---|
| 1,467,373 | 9/1923 | Gowin . |
| 2,449,915 | 9/1948 | Stalder ............................... 116/281 |
| 2,959,149 | 11/1960 | Schwenk . |
| 3,166,041 | 1/1965 | Caggainello ....................... 116/173 |
| 3,192,633 | 7/1965 | Pratt .................................... 33/787 |
| 3,460,258 | 8/1969 | Geary et al. ........................ 33/1 H |
| 3,523,515 | 8/1970 | Brown ................................ 116/209 |
| 3,538,608 | 11/1970 | Bronson ............................. 33/1 H |
| 3,927,637 | 12/1975 | Sammaritano ..................... 116/209 |
| 4,058,079 | 11/1977 | Taylor et al. ...................... 116/283 |
| 4,915,055 | 4/1990 | Ptashinski ......................... 116/209 |
| 4,995,168 | 2/1991 | Shiner ................................ 33/529 |
| 5,309,644 | 5/1994 | Robinson, Jr. et al. ............ 33/293 |
| 5,345,685 | 9/1994 | Bloor ................................. 33/308 |

Primary Examiner—William A. Cuchlinski, Jr.
Assistant Examiner—Willie Morris Worth
Attorney, Agent, or Firm—Gardner, Carton & Douglas

[57] ABSTRACT

A utility pipe displacement sensor comprises a protective housing and an indicator stick disposed in a vertical position within the housing. The indicator stick is capable of displacement within the housing and is maintained in its vertical position within the housing by the use of centralizing discs or nails. The sensor is arranged in such a manner that the lower ends of both the housing and the indicator stick are in communication with the outer surface of a buried utility pipe. Due to this arrangement, any displacement of the utility pipe is translated into a visually perceptible displacement of the indicator stick within the housing. Thus, any displacement of the utility pipe can be determined by determining the position of the indicator stick with respect to the housing.

20 Claims, 1 Drawing Sheet

U.S. Patent  Feb. 18, 1997  5,603,282
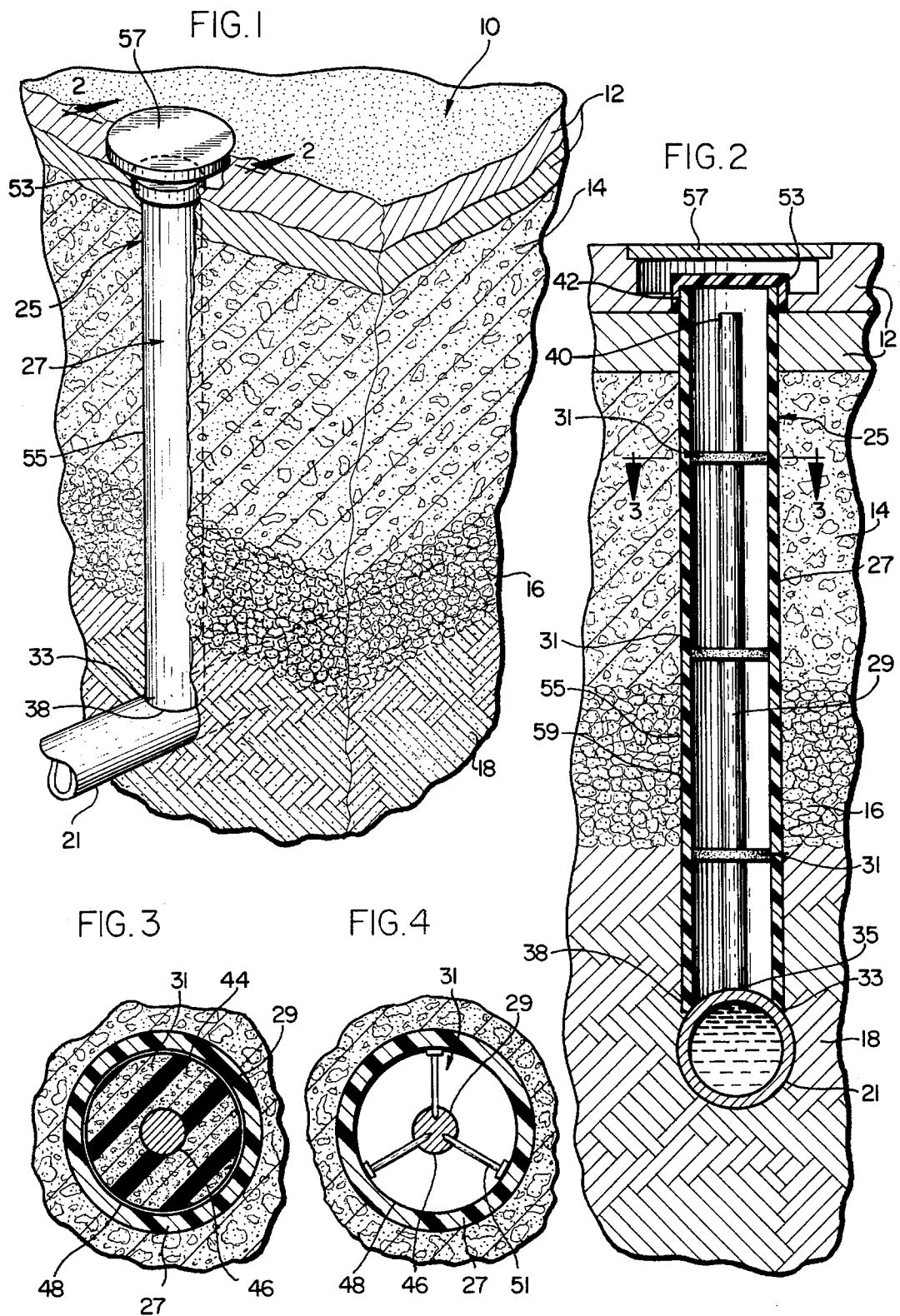

UTILITY PIPE DISPLACEMENT SENSOR

BACKGROUND OF THE INVENTION

This invention relates generally to displacement sensors and more particularly to sensors for use with buried utility pipes.

One of the largest problems encountered in the Midwest and elsewhere during construction involving deep excavations in urban areas has been earth displacement. When it occurs, earth displacement often results in extensive damage to adjacent facilities. This earth displacement is attributed to the fact that some ground includes large amounts of clay or other constituents which have little load bearing capacity and thus have a tendency to flow or subside. Historically, such displacement has been monitored using survey points on retention systems, survey points on the adjacent ground surface, and inclinometers. However, these systems do not provide information regarding the existing utility pipes and other underground structures located in the zone of influence of the excavation.

Some of the devices used in the past to detect displacement of buried utility pipes have been unable to provide sufficient warning of situations in which a utility pipe has acted as a bridge across a sub-surface void. Often such devices would not accurately indicate displacement until the pipe was so stressed as to crack or break.

Further, the devices used in the past often have been quite complicated in structure and thus expensive to manufacture. Additionally, the complicated structure has led to malfunctions during use and thus problems with reliability. Consequently, these complicated devices have required a considerable amount of maintenance in attempts to keep them in proper working order. All these efforts contribute to the cost of construction.

Thus, it is an object of the instant invention to provide a utility pipe displacement sensor which reliably indicates buried utility pipe displacement of even a small magnitude.

It is another object of the instant invention to provide a utility pipe displacement sensor which requires little or no maintenance to keep it in proper working order.

It is yet another object of the instant invention to provide a reliable utility pipe displacement sensor which is not complicated in structure and which is easy and inexpensive to manufacture.

It is a further object of the instant invention to provide a reliable utility pipe displacement sensor which is easy to install and monitor.

These and other objects and advantages of the instant invention will be apparent from the following description and drawings.

SUMMARY OF THE INVENTION

The present invention overcomes the deficiencies of the prior art devices by providing a utility pipe displacement sensor comprising a protective housing and an indicator means disposed in a vertical position within the housing. The indicator means is capable of displacement within the housing and is maintained in its vertical position within the housing by the use of centralizing discs or nails. The sensor is arranged in such a manner that the lower ends of both the housing and the indicator means arc in communication with the outer surface of a buried utility pipe. Due to this arrangement, any displacement of the utility pipe is translated into a visually perceptible displacement of the indicator means within the housing. Thus, any displacement of the utility pipe can be determined by inspecting the position of the indicator means with respect to the housing.

The utility pipe displacement sensor of the instant invention provides an earlier signal of utility pipe displacement beneath paved surfaces than the devices used in the past. By using the sensor of the instant invention, the settlement of a utility pipe can be determined before there is a noticeable settlement on the surface. This advance indication can then be investigated before a catastrophe occurs.

Because of its design, the sensor is more reliable than similar devices of the prior art. Its straightforward design is not prone to malfunctions and consequently requires little or no maintenance. Further, the housing of the sensor completely enclosing the indicator means and thus protecting it from interference from its surroundings contributes to the reliability of the sensor.

Further, due to its straightforward design, the sensor is not complicated to manufacture and thus its manufacturing costs are minimal. This is in sharp contrast to the sensors of the prior art that were very complicated in structure and thus expensive to manufacture.

Because these sensors are inexpensive to manufacture and easy to install and use, it becomes practical for a large number of these sensors to be used at a construction site or elsewhere. By installing these sensors in a comprehensive manner and monitoring them frequently, inspectors will be able to identify, at an early stage, any displacement of underground utilities. This early identification will result in savings of both time and money.

BRIEF DESCRIPTION OF THE DRAWINGS

FIG. 1 is a perspective view of the instant invention illustrated in use;

FIG. 2 is a cross sectional view taken substantially in the plane of line 2—2 in FIG. 1;

FIG. 3 is a cross-sectional view taken substantially in the plane of line 3—3 in FIG. 2; and FIG. 4 is a view similar to FIG. 3, but showing another embodiment of the invention.

DETAILED DESCRIPTION OF THE INVENTION

As shown in FIGS. 1 and 2, a typical ground environment 10 consists of layers of bituminous road surface material 12, concrete 14, stone 16, and soil 18. In order to provide some type of utility, whether sewer, water, gas or electrical, to a user, a utility pipe 21 is provided in the soil layer 18, as shown in FIG. 1. Such a utility pipe may shift or subside, thereby straining or breaking the pipe. It is the displacement of such a utility pipe which the sensor of the instant invention reliably detects.

To provide means for sensing the displacement of a utility pipe in accordance with the instant invention which is reliable, not prone to malfunctions, inexpensive to manufacture, and easy to install and monitor, there is provided a utility pipe displacement sensor 25 comprising a protective housing 27 and an indicator means 29 disposed in a vertical position within the housing 27. The indicator means 29 is capable of displacement within the housing 27 and is maintained in its vertical position within the housing 27 by the use of centralizing means 31. The sensor 25 is arranged in such a manner that the lower ends 33, 35 of both the housing 27 and the indicator means 29 are in communication with the outer surface 38 of a buried utility pipe 21. Due to this arrangement, any displacement of the utility pipe 21 is translated into a visually perceptible displacement of the indicator means 29 within the protective housing 27. Thus, any displacement of the utility pipe 21 can be determined by periodically inspecting and determining the position of the indicator means 29 with respect to the housing 27.

The utility pipe displacement sensor 25 made in accordance to the principles of the present invention is shown in FIGS. 1–4. The sensor 25 can be used with any type of utility pipe, such as sewer, water, gas or electrical. The housing 27 of the sensor 25 is preferably made from a vertical section of, for example, PVC pipe. The diameter of the housing 27 can be approximately from 3 inches to 6 inches and preferably 3 inches. The length of the housing 27 can vary since it is dependent upon the depth of the utility pipe to be monitored.

In a preferred embodiment, the indicator means 29 comprises an indicator stick which is capable of displacement within the housing 27. The indicator stick 29 can be constructed from a number of different materials, such as PVC, wood or metal. The housing 27 protects the indicator stick 29 from the elements in the ground that might prevent it from functioning properly. While the lower end 35 of the indicator stick 29 abuts the outer surthce 38 of the buried utility pipe 21, an upper end 40 of the indicator stick 29 is located adjacent to an upper end 42 of the housing 27.

The centralizing means 31 of the sensor 25 are placed at regular intervals along the length of the indicator stick 29 in order to maintain the indicator stick 29 in a vertical position within the housing 27. The centralizing means 31 can take a number of different forms. In one embodiment, the centralizing means 31 comprise rings or discs 44, as shown in FIGS. 2 and 3. The rings 44 fit around the outer surthce 46 of the indicator stick 29 and cooperate with the inside wall 48 of the housing 27 in order maintain the stick 29 in its vertical position. The rings 44 can be constructed from foam, plastic or some other suitable material. In an alternate embodiment shown in FIG. 4, the centralizing means 31 comprise a plurality of rigid elements 51. The rigid elements 51 penetrate the indicator stick 29 and extend outwardly therefrom towards the inside wall 48 of the housing 27. The rigid elements 51 preferably take the form of nails.

To prevent any interference with the proper functioning of the sensor 25 from above ground, a cap 53 covers the upper end 42 of the housing 27 and the upper end 40 of the indicator stick 29. In order to observe the indicator stick 29, the cap 53 is simply removed. The cap 53 is constructed from any suitable material, preferably PVC.

In a preferred embodiment, the sensor 25 includes means for marking the initial position of the indicator stick 29 with respect to the housing 27. Such a feature is desirable so that a change in the position of the indicator stick 29 can be more accurately determined.

To install the sensor 25 in and below the bituminous road surface material layers 12, a hole 55 is drilled or formed through the layers 12 and into the ground through the various layers down to the utility pipe 21 to be monitored. The protective housing 27 is then inserted into the hole 55, its upper end 42 remaining at about the level of the road surface while its lower end 33 abuts the utility pipe 21. After refilling the area around the housing 27, the indicator stick 29 with the centralizing means 31 is then inserted into the housing 27 until the lower end 35 of the stick 29 comes into contact with the outer surface 38 of the utility pipe 21. The upper end 42 of the housing 27 is then covered using the cap 53. The break in the road surface can be sealed using a steel plate 57 shown in FIG. 2.

In order to determine whether the utility pipe 21 has undergone displacement, the steel plate 57 and the cap 53 are removed and the position of the indicator stick 29 is examined. If the utility pipe 21 has undergone displacement, this displacement will have been translated into a change in the position of the indicator stick 29 with respect to the housing 27. Thus, if the upper end 40 of the indicator stick 29 has changed position, this change will indicate that the utility pipe 21 has moved from its original position. Consequently, suitable action can be taken in order to prevent substantial damage. It should be noted that the interaction of the outer surface 59 of the housing 27 with the surrounding earth prevents the housing 27 from moving with the indicator stick 29. Thus, any change in the position of the indicator stick 29 with respect to the housing 27 can be attributed to displacement of the utility pipe 21.

It should be understood that various changes and modifications to the preferred embodiments described herein will be apparent to those skilled in the art. Such changes and modifications can be made without departing from the spirit and scope of the instant invention and without diminishing its attendant advantages. It is therefore intended that such changes and modifications be covered by the appended claims.

I claim:

1. A utility pipe displacement sensor for use with a buried utility pipe comprising:

a protective housing buried in the ground and having an upper and a lower end, an indicating means disposed in a vertical position within the housing and capable of displacement within the housing, the indicating means having an upper and a lower end, the upper end of the indicating means originally being located adjacent to the upper end of the housing; and centralizing means associated with the indicating means for maintaining the indicating means in its vertical position within the housing, both the lower end of the housing and the lower end of the indicating means originally abutting an outer surface of a utility pipe, so that any displacement of the utility pipe relative to the lower end of the housing is translated into a visually perceptible displacement of the indicating means within the housing, the housing not being displaced due to its interaction with the surrounding ground.

2. The utility pipe displacement sensor of claim 1 wherein the housing comprises a vertical section of pipe.

3. The utility pipe displacement sensor of claim 2 wherein the pipe is constructed of PVC.

4. The utility pipe displacement sensor of claim 1 wherein the centralizing means comprise a plurality of discs disposed about the indicating means.

5. The utility pipe displacement sensor of claim 4 wherein the discs are made of foam.

6. The utility pipe displacement sensor of claim 4 wherein the discs are made of plastic.

7. The utility pipe displacement sensor of claim 1 wherein the centralizing means comprise a plurality of rigid elements, each element extending outwardly from the indicating means towards an inside wall of the protective housing.

8. The utility pipe displacement sensor of claim 7 wherein the rigid elements comprise nails.

9. The utility pipe displacement sensor of claim 1 wherein the centralizing means are spaced along the length of the indicating means.

10. The utility pipe displacement sensor of claim 1 wherein an upper end of the housing is provided with a cap.

11. A utility pipe displacement sensor for use with a buried utility pipe comprising:

a protective housing buried in the ground and having an upper end, an indicator stick disposed in a vertical position within the housing and capable of displacement within the housing, the indicator stick originally having an upper end located adjacent to the upper end of the housing; and centralizing means associated with the indicator stick for maintaining the indicator stick in its vertical position within the housing, both the housing and the indicator stick originally abutting an outer surface of a utility pipe, so that any displacement of the utility pipe relative to the housing is translated into a visually perceptible displacement of the indicator stick within the housing, the housing not being displaced due to its interaction with the surrounding ground.

12. The utility pipe displacement sensor of claim 11 wherein the housing comprises a vertical section of pipe.

13. The utility pipe displacement sensor of claim 12 wherein the pipe is constructed of PVC.

14. The utility pipe displacement sensor of claim 11 wherein the centralizing means comprise a plurality of discs disposed about the indicator stick.

15. The utility pipe displacement sensor of claim 11 wherein the centralizing means comprises a plurality of rigid elements, each element extending outwardly from the indicator stick towards an inside wall of the protective housing.

16. The utility pipe displacement sensor of claim 15 wherein the rigid elements comprise nails.

17. The utility pipe displacement sensor of claim 11 wherein the centralizing means are spaced along the length of the indicator stick.

18. The utility pipe displacement sensor of claim 11 wherein a lower end of the indicator stick abuts the outer surface of the utility pipe.

19. The utility pipe displacement sensor of claim 11 wherein a lower end of the protective housing abuts the outer surface of the utility pipe.

20. The utility pipe displacement sensor of claim 11 wherein an upper end of the housing is provided with a cap.

* * * * *